United States Patent
Nakatsu et al.

(10) Patent No.: US 7,463,547 B2
(45) Date of Patent: Dec. 9, 2008

(54) MICRO COMPUTER AND METHOD OF OPTIMIZING MICROCOMPUTER

(75) Inventors: Shinichi Nakatsu, Kanagawa (JP); Hideo Isogai, Kanagawa (JP); Takehiro Masumoto, Kanagawa (JP); Kazuyuki Nishizawa, Kanagawa (JP); Toshihide Tsuboi, Kanagawa (JP); Kimiharu Etou, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 301 days.

(21) Appl. No.: 11/339,567

(22) Filed: Jan. 26, 2006

(65) Prior Publication Data

US 2006/0190849 A1    Aug. 24, 2006

(30) Foreign Application Priority Data

Jan. 27, 2005    (JP) ............... 2005-020447

(51) Int. Cl.
*G11C 8/00*    (2006.01)

(52) U.S. Cl. .............. 365/233.1; 365/234; 365/215; 365/64; 716/2; 700/28; 327/185; 331/51; 377/98

(58) Field of Classification Search ........... 365/233, 365/233.1, 233.11, 234, 215, 64; 377/98; 716/2; 700/28; 327/185; 331/51

See application file for complete search history.

(56) References Cited

U.S. PATENT DOCUMENTS

| | | | | |
|---|---|---|---|---|
| 5,751,655 A | * | 5/1998 | Yamazaki et al. | 365/233 |
| 6,160,755 A | * | 12/2000 | Norman et al. | 365/233 |
| 6,226,222 B1 | * | 5/2001 | Park | 365/233 |
| 6,272,067 B1 | * | 8/2001 | Sun et al. | 365/233 |

FOREIGN PATENT DOCUMENTS

JP    2003-178589 A    6/2003

* cited by examiner

*Primary Examiner*—Pho M. Luu
*Assistant Examiner*—Eric Wendler
(74) *Attorney, Agent, or Firm*—Sughrue Mion, PLLC

(57) ABSTRACT

A microcomputer includes a circuit block; a nonvolatile memory configured to store optimization data for optimization of an operation of the microcomputer; and an optimization circuit configured to read out memory optimization data as a part of the optimization data from the nonvolatile memory in synchronization with a first frequency clock signal as an first clock signal to optimize an operation of the nonvolatile memory, and then to read out circuit block optimization data as another part of the optimization data from the nonvolatile memory in synchronization with a second frequency clock signal as the first clock signal to optimize an operation of the circuit block. The frequency of the first frequency clock signal is lower than that of the second frequency clock signal.

19 Claims, 3 Drawing Sheets

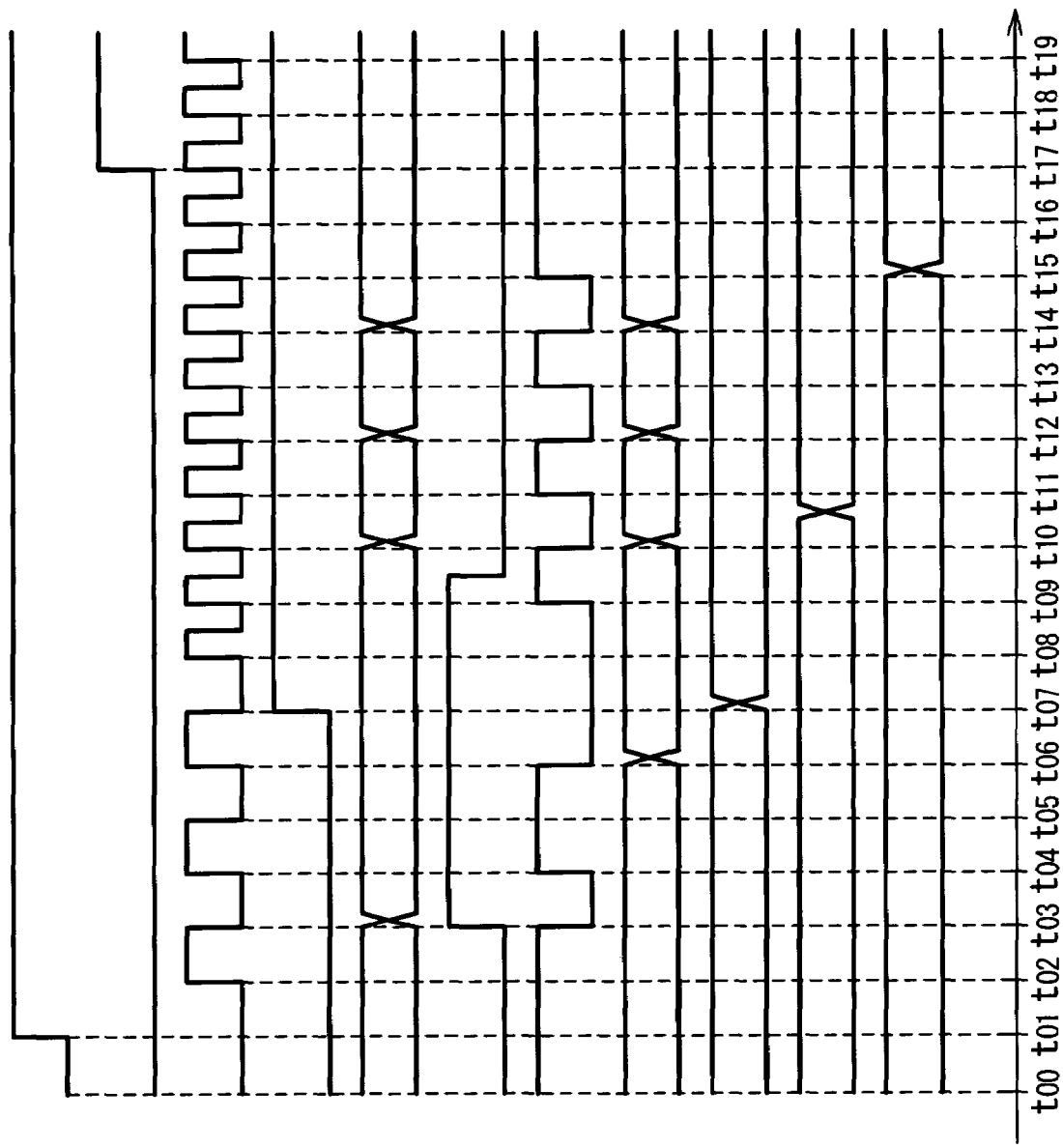

MICRO COMPUTER AND METHOD OF OPTIMIZING MICROCOMPUTER

BACKGROUND OF THE INVENTION

1. Field of the Invention

The present invention relates to a microcomputer and a method of optimizing the microcomputer.

2. Description of the Related Art

In association with the advancement of a semiconductor technology, a microcomputer has been popular in which a plurality of circuit function blocks, especially, a CPU and memories such as RAM or ROM are provided inside a single chip. Recently, a microcomputer including a nonvolatile memory such as a flash memory has been supplied. The nonvolatile memory provided in the microcomputer has an analog circuit such as a charging pump circuit. A variation in manufacture of the microcomputer causes a variation of characteristics of the analog circuit. Thus, in order to keep the performance and quality of the microcomputer, it is necessary to optimize read/write operations to the nonvolatile memory before the internal CPU starts its operation. A technique for optimizing the nonvolatile memory is disclosed in Japanese Laid Open Patent Application (JP-P2003-178589A) as a first conventional example.

In the first conventional example, an initial setting data region is provided in a usual memory cell array to write an initial setting data therein. The initial setting data is automatically read out by a decoding circuit and sensed by a sense amplifying circuit, in a same way as a usual data reading operation after a power source is turned on. Then, the sensed data is latched in a latching circuit. In such a nonvolatile memory, when an amount of the initial setting data is large, a long wait time is needed until the completion of the read operation of the initial setting data after the power source is turned on, or a verifying operation is completed.

The above conventional nonvolatile memory is provided with the memory cell array for storing the initial setting data to define a memory operation condition; a control circuit for controlling read/write/erase operations to the memory cell array; a decoding circuit for selecting memory cells of the memory cell array in accordance with an access signal; a sense amplifying circuit for sensing and amplifying a data read out from the selected memory cells; a latching circuit for latching the initial setting data; and a clock generating circuit for generating a clock signal to define operation timing of the control circuit. In order to shorten the above wait time, the control circuit reads out a clock cycle adjustment data contained in the initial setting data after the power source is turned on, and adjusts a period of a clock signal generated from the clock generating circuit based on the clock cycle adjustment data. Then, the control circuit reads out the remaining initial setting data in accordance with the adjusted clock signal.

As described above, in the first conventional example, the read operation of the initial setting data is carried out before read timing optimal for the nonvolatile memory is set. In order to read out data from the nonvolatile memory on which the optimization (adjustment) of the reading timing is not yet carried out, the clock signal whose frequency is low is required to be used as a read clock signal.

Here, when the technique of the first conventional example is applied to the microcomputer, the setting of the initial setting data is carried out in the period until the CPU starts to operate after the power source is turned on or after a reset state is released. In this period, the microcomputer operates in synchronization with the read clock signal having a low frequency. Thus, there may be a case where a long time is required until the operation start of the CPU after the power source of the microcomputer is turned on or after the reset is carried out.

SUMMARY OF THE INVENTION

In an aspect of the present invention, a microcomputer includes a circuit block; a nonvolatile memory configured to store optimization data for optimization of an operation of the microcomputer; and an optimization circuit configured to read out memory optimization data as a part of the optimization data from the nonvolatile memory to optimize an operation of the nonvolatile memory, and then to read out circuit block optimization data as another part of the optimization data from the nonvolatile memory to optimize an operation of the circuit block.

Here, a clock switching circuit contained in the optimization circuit includes reads out the memory optimization data from the nonvolatile memory in synchronization with a first frequency clock signal as an first clock signal to optimize the operation of the nonvolatile memory, and then reads out the circuit block optimization data from the nonvolatile memory in synchronization with a second frequency clock signal as the first clock signal to optimize the operation of the circuit block. The frequency of the first frequency clock signal is lower than that of the second frequency clock signal.

Also, when the microcomputer further includes a CPU, the optimization circuit generates the first clock signal until the optimization is completed, and then generates a second clock signal for the CPU.

In this case, the clock switching circuit stops output of the first clock signal and outputs the second clock signal, in response to the completion of the optimization to be carried out based on the optimization data.

Also, the clock switching circuit includes a first counter configured to frequency-divide a first reference clock signal to generate the second frequency clock signal; a second counter configured to frequency-divide the second frequency clock signal to generate the first frequency clock signal; a first selector configured to selectively output as the first clock signal, one of the first frequency clock signal and the second frequency clock signal in response to a first selection control signal; and a third counter configured to generate the first selection control signal in synchronization with completion of the optimization of the nonvolatile memory.

Also, the microcomputer may further include a first oscillator configured to generate the first reference clock signal; and a second oscillator configured to generate a second reference clock signal as the second clock signal. The clock switching circuit may further include a second selector configured to select as an operation clock signal, one of the first clock signal and the second clock signal based on a second selection control signal. The CPU starts its operation in response to the operation clock signal.

Also, an operation of the first oscillator is preferably stabilized earlier than that of the second oscillator, after a power source is turned on.

Also, the third counter outputs the first selection control signal when a predetermined number of pulses of the first frequency clock signal are inputted to the third counter.

also, the nonvolatile memory may be a flash memory.

In another aspect of the present invention, a microcomputer includes a circuit block; a nonvolatile memory configured to store optimization data for optimization of an operation of the microcomputer; and an optimization circuit configured to read out memory optimization data as a part of the optimization data from the nonvolatile memory in response to a first frequency clock signal and to optimize an operation of the nonvolatile memory based on the memory optimization data; and then to read out circuit block optimization data as another part of the optimization data from the nonvolatile memory in response to a second frequency clock signal and to optimize an operation of the circuit block based on the circuit block optimization data. The frequency of the first frequency clock signal is lower than that of the second frequency clock signal.

Here, the optimization circuit includes a first oscillator configured to generate a first reference clock signal; and a second oscillator configured to generate a second reference clock signal as the second clock signal; a first counter configured to frequency-divide the first reference clock signal to generate the second frequency clock signal; a second counter configured to frequency-divide the second frequency clock signal to generate the first frequency clock signal; a first selector configured to selectively output as the first clock signal, one of the first frequency clock signal and the second frequency clock signal in response to a first selection control signal; and a shift register configured to generate the first selection control signal in synchronization with completion of the optimization of the nonvolatile memory.

In this case, the operation of the first oscillator is preferably stabilized earlier than that of the second oscillator, after a power source is turned on.

Also, the shift register outputs the first selection control signal when a predetermined number of pulses of the first frequency clock signal are inputted to the third counter.

Also, the microcomputer may further comprising a CPU. The optimization circuit generates the first clock signal until the optimization is completed, and then generates a second clock signal, and the CPU starts its operation in response to the operation clock signal.

Also, the optimization circuit may further include a second selector configured to select as an operation clock signal, one of the first clock signal and the second clock signal based on a second selection control signal.

In a still another aspect of the present invention, a method of optimizing a microcomputer, is achieved by generating a first clock signal until the optimization of the microcomputer is completed; by reading out memory optimization data as a part of optimization data for optimization of an operation of the microcomputer from a nonvolatile memory in synchronization with a first frequency clock signal of the first clock signal to optimize an operation of the nonvolatile memory; by reading out circuit block optimization data as another part of the optimization data from the nonvolatile memory in synchronization with a second frequency clock signal of the first clock signal to optimize an operation of a circuit block; and by generating a second clock signal after the optimization of the microcomputer is completed. The frequency of the first frequency clock signal is lower than that of the second frequency clock signal, and a CPU operates in response to the second clock signal.

The generating a first clock signal is achieved by frequency-dividing a first reference clock signal to generate the second frequency clock signal; by frequency-dividing the second frequency clock signal to generate the first frequency clock signal; by outputting the first frequency clock signal as the first clock signal until a predetermined number of pulses of the first frequency clock signal are supplied to a counter; and by outputting the second frequency clock signal as the first clock signal after the predetermined number of pulses of the first frequency clock signal are supplied to the counter.

Also, the first reference clock signal is stabilized earlier than the second reference clock signal, after a power source is turned on.

Also, the nonvolatile memory is a flash memory.

BRIEF DESCRIPTION OF THE DRAWINGS

FIGS. 3A to 3K are timing charts showing an operation of a microcomputer in this embodiment.

DESCRIPTION OF THE PREFERRED EMBODIMENTS

Hereinafter, a microcomputer of the present invention will be described in detail with reference to the attached drawings.

Figure 1:
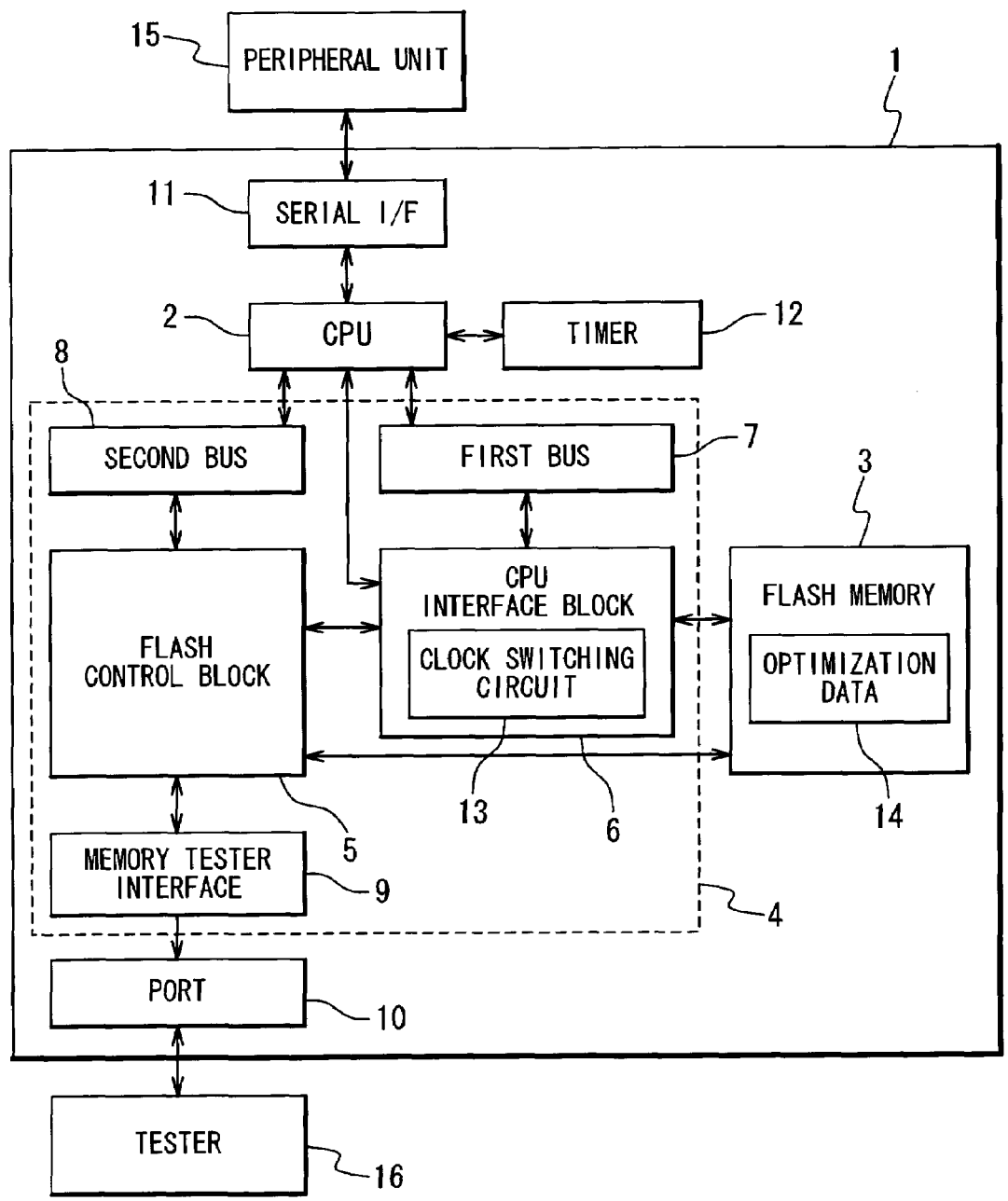
FIG. 1 is a circuit diagram showing a configuration of a microcomputer according to an embodiment of the present invention.

FIG. 1 is a block diagram showing a microcomputer according to an embodiment of the present invention. In the following embodiment, the microcomputer 1 is formed on a single chip. However, this does not imply that the present invention.

With reference to FIG. 1, the microcomputer 1 in this embodiment is provided with a CPU 2, a flash memory as a flash macro 3, a control block 4, a port 10, a serial interface (I/F) 11, and a timer 12. The CPU is connected with the timer 12 and is connected with a peripheral unit 15 through the serial interface 11. The timer 12 generates a timer interrupt to the CPU 2. Moreover, the CPU 2 is connected through the serial interface 11 to the peripheral unit 15. Also, the control block 4 is connected with an external tester 16 through the port 10 at the time of a test. The tester 16 is an external unit to test the microcomputer 1.

The peripheral unit 15 outputs a command to the CPU 2 through the serial interface 11 and receives a data from the CPU 2 through the serial interface 11. The CPU 2 controls the internal or external blocks of the microcomputer 1 based on the received command and data processed in the microcomputer 1. Also, the CPU 2 carries out processing of data received from the peripheral unit 15 through the serial interface 11. Although FIG. 1 shows only one peripheral unit 15, this does not imply the limit of the number of the peripheral units 15.

The flash memory 3 is a rewritable nonvolatile memory connected with the control block 4. As shown in FIG. 1, the flash memory 3 holds an optimization data 14. The optimization data 14 is used to optimize the operation of the microcomputer 1. The optimization data 14 is stored in a predetermined storage region of the flash memory 3. In this embodiment, a part of the optimization data 14 is used for the setting of a boosting circuit in the flash memory 3. Another part of the optimization data is used for optimizing an operation of another block of the microcomputer 1 other than the boosting circuit.

With reference to FIG. 1, the control block 4 is provided a flash control block 5, a CPU interface block 6 with a clock switching circuit 13, a first bus 7, a second bus 8 and a memory tester interface 9. The flash control block 5 is connected with the second bus 8, which is connected with the CPU 2, and the memory tester interface 9, which is connected with the port 10. A signal outputted from the tester 16 at the time of the test is sent to the flash control block 5 through the memory tester interface 9. Also, the flash control block 5 is connected with the CPU interface block 6 and the flash memory 3. The flash control block 5 writes data in the flash memory 3 and erases the data in the flash memory 3 in response to an instruction from the CPU 2 through the second bus 8. The CPU interface block 6 is connected with the CPU 2 directly and through the first bus 7, the flash control block 5, and the flash memory 3. The CPU interface block 6 carries out interfacing between the CPU 2 and the flash memory 3 and the flash control block 5 and the flash memory 3. The CPU interface block 6 carries out a read control to the flash memory 3 and optimization to be carried out prior to the operation start of the CPU 2. The first bus 7 is provided between the CPU interface block 6 and a predetermined register in the CPU 2. The operation of the CPU interface block 6 is controlled based on the contents of the register. The CPU interface block 6 has registers and flags that are set in advance although being not shown. These register and flag are preferably designed so as not to be directly accessed from the CPU 2. The clock switching circuit 13 of the CPU interface block 6 generates a clock signal of the CPU interface block 6. The detailed configuration of the clock switching circuit 13 will be described later.

More specifically, the CPU interface block 6 accesses the flash memory 3 prior to the start of the CPU operation, reads out the optimization data 14 and optimizes the flash memory 3. Here, the optimization of the flash memory 3 is, for example, fine adjustment of an output voltage of a charging pump circuit in the flash memory 3. Also, when the flash memory 3 has built-in oscillators (not shown) for supplying a clock signal to the charging pump circuit, the CPU interface block 6 carries out fine adjustment of the frequency of the clock signal. Moreover, the CPU interface block 6 adjusts or optimizes a reference read current from the flash memory 3 and a reference write current to the flash memory 3. A read time and a write time are adjusted through this adjustment of these reference currents. In addition, the CPU interface block 6 optimizes other circuit blocks other than the flash memory 3 after the optimization of the flash memory 3. In this case, since the flash memory 3 is optimized, the optimization data for the other circuit blocks can be read from the flash memory 3 at a high speed. Thus, it is possible to shorten a time period until the operation start of the CPU 2 after the power source is turned on or after the reset is carried out.

Figure 2:
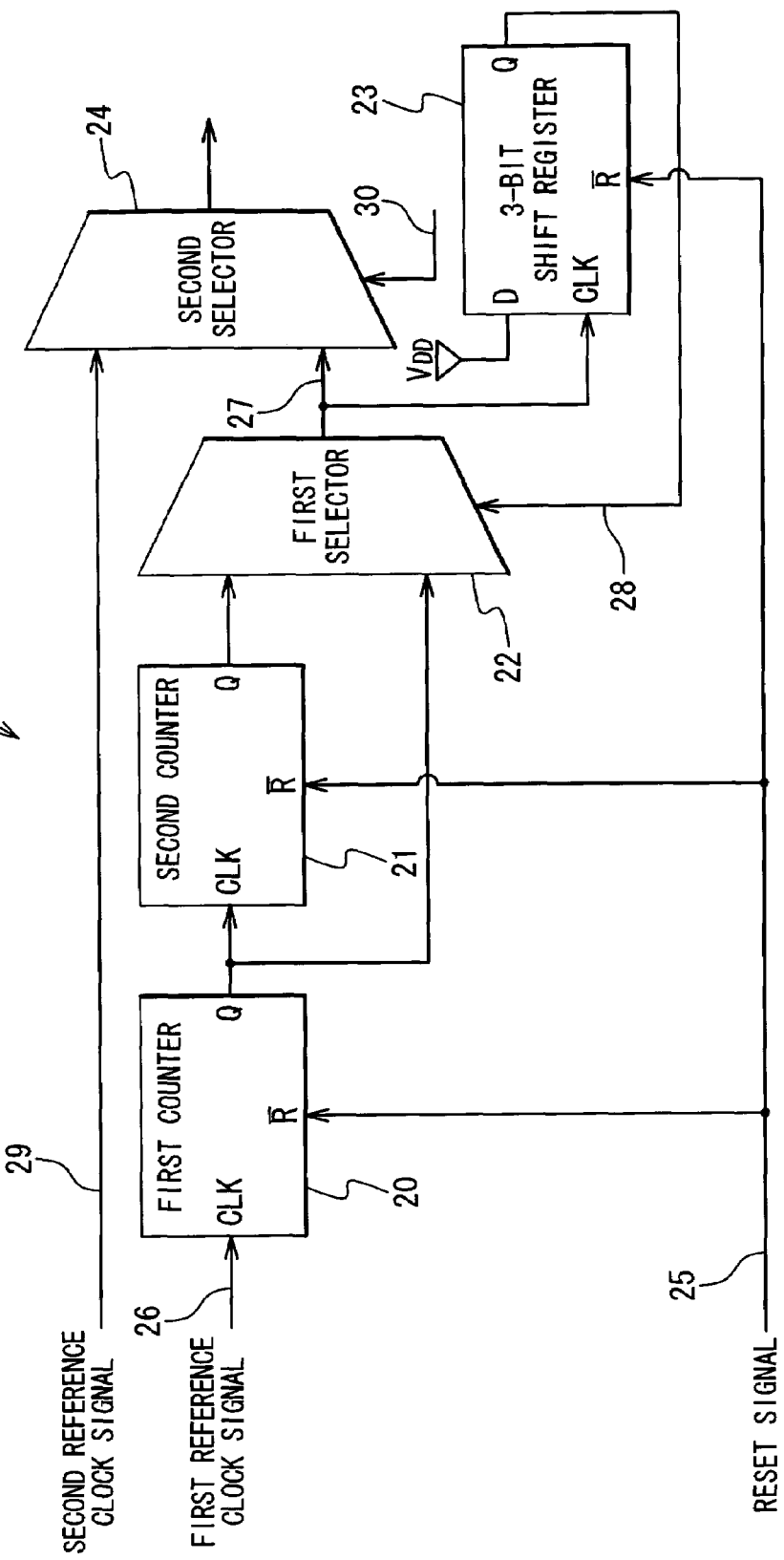
FIG. 2 is a circuit diagram showing a detailed configuration of a clock switching circuit.

FIG. 2 is a block diagram showing a detailed configuration of the clock switching circuit 13. With reference to FIG. 2, the clock switching circuit 13 is provided with a first counter 20, a second counter 21, a first selector 22, a 3-bit shift register 23 and a second selector 24. A first reference clock signal 26 is supplied from a first oscillator such as a ring oscillator although being not shown. Also, a second reference clock signal 29 is supplied from a second oscillator such as another ring oscillator or a crystal oscillator although being not shown. It is preferable that the oscillation of the first oscillator is stabilized in a shorter time than the second oscillator. Also, it is preferable that the second reference clock signal 29 has a higher precision than that of the first reference clock signal 26. It should be noted that there is no limit on the positions where the first and second oscillators are provided. For example, the respective oscillators may be provided at predetermined positions in the microcomputer 1, so that the first reference clock signal 26 and second reference clock signal 29 may be supplied to the clock switching circuit 13. Also, the first and second oscillators may be provided outside the microcomputer 1.

The respective function blocks shown in FIG. 2 will be described below. The first counter 20 receives a reset signal at a reset terminal. When the reset signal 25 is in a Low level, the first counter 20 is in a reset state. When the reset signal 25 is in a High level, the first counter 20 is in an operable state. The first counter 20 is connected to the first oscillator (not shown), and an output of the first counter 20 is connected to the second counter 21 and one input of the first selector 22. The first counter 20 frequency-divides the first reference clock signal 26 to generate a first frequency-divided clock signal having ½ of a frequency of the first reference clock signal.

The second counter 21 receives the reset signal at a reset terminal. When the reset signal 25 is in the Low level, the second counter 21 is in a reset state. When the reset signal 25 is in the High level, the second counter 21 is in an operable state. The second counter 21 frequency-divide the first frequency-divided clock signal to generate a second frequency-divided clock signal having ⅛ times of a frequency of the first frequency-divided clock signal. An output of the second counter 21 is connected to the other input of the first selector 22.

The first selector 22 receives the first frequency-divided clock signal from the first counter 20 and the second frequency-divided clock signal from the second counter 21. The first selector 22 receives a first selection control signal 28. When the first selection control signal 28 is in the Low level, the first selector 22 selects the second frequency-divided clock signal as an operation clock signal 27. Also, when the first selection control signal 28 is in the How level, the first selector 22 selects the first frequency-divided clock signal as an operation clock signal 27. An output of the first selector 22 is connected to one input of the second selector 24 and an input CLK of the 3-bit shift register 23.

The 3-bit shift register 23 receives the reset signal at a reset terminal. When the reset signal 25 is in the Low level, the second counter 21 is in a reset state and outputs the first selection control signal 28 of the Low level. When the reset signal 25 is in the High level, the second counter 21 is in an operable state and can output the first selection control signal 28 of the High level. A data terminal of the 3-bit shift register 23 is connected with a power source line VDD. The 3-bit shift register 23 shifts the High level in synchronization with the operation clock signal 27 outputted from the first selector 22. Thus, when the 3-bit shift register 23 receives three clock pulses of the operation clock signal 27, the 3-bit shift register 23 generates the first selection control signal 28 of the High level.

The second selector 24 is connected to the second oscillator (not shown). The second selector 24 receives the operation clock signal 27 from the first selector 22 and the second reference clock signal 29 from the second oscillator. The second selector 24 selects the operation clock signal 27 when a second selection control signal 30 is in the Low level and the second reference clock signal 29 when the second selection control signal 30 is in the High level. The second selection control signal 30 may be generated by the CPU interface block 6.

As shown in FIG. 2, the first frequency-divided clock signal has ½ of the frequency of the first reference clock signal 26. The second frequency-divided clock signal has ⅛ times of the frequency of the first frequency-divided clock signal, namely, 1/16 times of the frequency of the first reference clock signal 26. The reset signal 25 of the Low level is first supplied so that the first counter 20, the second counter 21 and the 3-bit shift register 23 maintain their reset states. When the reset states should be released, the reset signal 25 of the High level is supplied to the first counter 20, the second counter 21 and the 3-bit shift register 23. In response to the reset signal 25 of the High level, the second frequency-divided clock signal is outputted as the operation clock signal 27. Immediately after the reset state is released, the second frequency-divided clock signal serves as the operation clock signal 27. If the three clock pulses of the operation clock signal 27 are supplied to the 3-bit shift register 23, the first selection control signal 28 becomes the High level. The first selector 22 selects the first frequency-divided clock signal as the operation clock signal 27 in response to the first selection control signal 28 of the High level. After that, until the CPU operation start, the second frequency-divided clock signal is sent as the operation clock signal 27.

FIGS. 3A to 3K are timing charts showing the operation of the clock switching circuit 13 until the CPU starts the operation after the reset state is released. FIG. 3A is a waveform view showing the reset signal 25. FIG. 3B is a waveform view showing a peripheral reset signal for resetting a peripheral unit for the microcomputer 1. FIG. 3C is a waveform view showing the operation clock signal 27. FIG. 3D is a waveform view showing the first selection control signal 28. FIG. 3E is a waveform view showing an address of the flash memory 3. FIG. 3F is a waveform view showing a control signal EX to specify a region where the optimization data of the flash memory 3 (the initial setting data of the flash memory 3) is stored. FIG. 3G is a waveform view showing a read clock signal RDCK of the flash memory 3. FIG. 3H is a waveform view showing data read out from the flash memory 3. FIG. 3I is a waveform view showing the optimization data to optimize the flash memory 3. FIG. 3J is a waveform view showing the optimization data to optimize circuit blocks other than the flash memory 3. FIG. 3K is a waveform view showing an option data that is individually set by a user.

At a time t01, when the reset signal 25 is changed from the Low level to the High level, the reset state is released. At this time, the output of the 3-bit shift register 23 as the first selection control signal 28 is in the Low level, as shown in FIG. 3D. Thus, the second frequency-divided clock signal is outputted as the operation clock signal 27 from the first selector 22. The CPU interface block 6 generates the address of the flash memory 3 and the control signal EX in synchronization with this clock signal, as shown in FIGS. 3E and 3F. The address that is firstly read by the CPU interface block 6 is the address where a part of the optimization data 14 to set the flash memory 3 to an optimal state is stored. The data in this address is read out at the falling edge (Time t06) of the read clock signal RDCK and set in a predetermined register at the falling edge (Time t07) of the next operation clock signal 27, as shown in FIGS. 3G, 3C and 3I. Thus, the optimization of the flash memory 3 is carried out.

Also, at this time, the 3-bit shift register 23 takes the High level data therein in synchronization with the second frequency-divided clock signal. The 3-bit shift register 23 generates the first selection control signal 28 of the High level at the falling edge of the operation clock signal at the time t07, and supplies it to the first selector 22. The first selector 22 selects and outputs the first frequency-divided clock signal as the operation clock 27 in response to the first selection control signal 28 of the High level. At this time, since the optimization of the flash memory 3 has been already completed, the data can be read out from the flash memory 3 in synchronization with the first frequency-divided clock signal at a time t08 and the subsequent times as the read clock signal.

Hereafter, a data for the optimization of the circuit blocks other than the flash memory 3 are read out from the region for the optimization data and set, as shown in FIGS. 3J and 3K. When the optimizations of the respective circuit blocks have been completed, the peripheral reset signal of the High level is generated as a time t17 such that the reset states of the peripheral units are released. The peripheral reset signal may be generated by the CPU interface block 6. Then, the CPU and the other peripheral units start their operations in the optimized states. At this time, the second selector 24 outputs the second reference clock signal 29 in response to the peripheral reset signal. That is, the peripheral reset signal functions as the second selection control signal.

In this way, the CPU interface block 6 in this embodiment firstly optimizes the flash memory 3 in synchronization with a clock signal at which the read operation from the flash memory 3 can be surely carried out when the power source is turned on or when the reset is released. Then, the CPU interface block 6 switches the read clock to the clock signal of a high frequency in response to the optimization completion of the flash memory 3, and optimizes the circuit blocks other than the flash memory 3 in response to the switched clock signal. Then, the microcomputer 1 starts the operation of the CPU 2 in response to the optimization completion. Consequently, it is possible to shorten the time period until the CPU operation is started after the power source is turned on or after the reset is released.

According to the present invention, the microcomputer can complete the optimization of its operation in the shorter time.

What is claimed is:

1. A microcomputer comprising:
    a circuit block;
    a nonvolatile memory configured to store optimization data for optimization of an operation of said microcomputer; and
    an optimization circuit configured to read out memory optimization data as a part of said optimization data from said nonvolatile memory to optimize an operation of said nonvolatile memory, and then to read out circuit block optimization data as another part of said optimization data from said nonvolatile memory to optimize an operation of said circuit block.

2. The microcomputer according to claim 1, wherein said optimization circuit comprises:
    a clock switching circuit configured to read out the memory optimization data from said nonvolatile memory in synchronization with a first frequency clock signal as an first clock signal to optimize the operation of said nonvolatile memory, and then to read out the circuit block optimization data from said nonvolatile memory in synchronization with a second frequency clock signal as said first clock signal to optimize the operation of said circuit block, and
    a frequency of said first frequency clock signal is lower than that of said second frequency clock signal.

3. The microcomputer according to claim 2, further comprising a CPU,
    said optimization circuit generates said first clock signal until the optimization is completed, and then generates a second clock signal for said CPU.

4. The microcomputer according to claim 2, wherein said nonvolatile memory is a flash memory.

5. The microcomputer according to claim 3, wherein said clock switching circuit stops output of said first clock signal and outputs said second clock signal, in response to the completion of the optimization to be carried out based on said optimization data.

6. The microcomputer according to claim 3, wherein said clock switching circuit comprises:
    a first counter configured to frequency-divide a first reference clock signal to generate said second frequency clock signal;
    a second counter configured to frequency-divide said second frequency clock signal to generate said first frequency clock signal;

a first selector configured to selectively output as said first clock signal, one of said first frequency clock signal and said second frequency clock signal in response to a first selection control signal; and a third counter configured to generate said first selection control signal in synchronization with completion of the optimization of said nonvolatile memory.

7. The microcomputer according to claim 6, further comprising:

a first oscillator configured to generate said first reference clock signal; and a second oscillator configured to generate a second reference clock signal as said second clock signal, wherein said clock switching circuit further comprises:

a second selector configured to select as an operation clock signal, one of said first clock signal and said second clock signal based on a second selection control signal, and said CPU starts its operation in response to said operation clock signal.

8. The microcomputer according to claim 6, wherein said third counter outputs said first selection control signal when a predetermined number of pulses of said first frequency clock signal are inputted to said third counter.

9. The microcomputer according to claim 7, wherein an operation of said first oscillator is stabilized earlier than that of said second oscillator, after a power source is turned on.

10. A microcomputer comprising:

a circuit block;

a nonvolatile memory configured to store optimization data for optimization of an operation of said microcomputer; and an optimization circuit configured to read out memory optimization data as a part of said optimization data from said nonvolatile memory in response to a first frequency clock signal and to optimize an operation of said nonvolatile memory based on said memory optimization data; and then to read out circuit block optimization data as another part of said optimization data from said nonvolatile memory in response to a second frequency clock signal and to optimize an operation of said circuit block based on said circuit block optimization data, and wherein a frequency of said first frequency clock signal is lower than that of said second frequency clock signal.

11. The microcomputer according to claim 10, wherein said optimization circuit comprises:

a first oscillator configured to generate a first reference clock signal;

a second oscillator configured to generate a second reference clock signal as said second clock signal;

a first counter configured to frequency-divide said first reference clock signal to generate said second frequency clock signal;

a second counter configured to frequency-divide said second frequency clock signal to generate said first frequency clock signal;

a first selector configured to selectively output as said first clock signal, one of said first frequency clock signal and said second frequency clock signal in response to a first selection control signal; and a shift register configured to generate said first selection control signal in synchronization with completion of the optimization of said nonvolatile memory.

12. The microcomputer according to claim 11, wherein an operation of said first oscillator is stabilized earlier than that of said second oscillator, after a power source is turned on.

13. The microcomputer according to claim 11, wherein said shift register outputs said first selection control signal when a predetermined number of pulses of said first frequency clock signal are inputted to said third counter.

14. The microcomputer according to claim 11, further comprising a CPU, wherein said optimization circuit generates said first clock signal until the optimization is completed, and then generates a second clock signal, and said CPU starts its operation in response to said operation clock signal.

15. The microcomputer according to claim 14, wherein said optimization circuit further comprises:

a second selector configured to select as an operation clock signal, one of said first clock signal and said second clock signal based on a second selection control signal.

16. A method of optimizing a microcomputer, comprising:

generating a first clock signal until the optimization of said microcomputer is completed;

reading out memory optimization data as a part of optimization data for optimization of an operation of said microcomputer from a nonvolatile memory in synchronization with a first frequency clock signal of said first clock signal to optimize an operation of said nonvolatile memory;

reading out circuit block optimization data as another part of said optimization data from said nonvolatile memory in synchronization with a second frequency clock signal of said first clock signal to optimize an operation of a circuit block; and generating a second clock signal after the optimization of said microcomputer is completed, wherein a frequency of said first frequency clock signal is lower than that of said second frequency clock signal, and a CPU operates in response to said second clock signal.

17. The method according to claim 16, wherein said generating a first clock signal comprises:

frequency-dividing a first reference clock signal to generate said second frequency clock signal;

frequency-dividing said second frequency clock signal to generate said first frequency clock signal;

outputting said first frequency clock signal as said first clock signal until a predetermined number of pulses of said first frequency clock signal are supplied to a counter; and outputting said second frequency clock signal as said first clock signal after the predetermined number of pulses of said first frequency clock signal are supplied to the counter.

18. The method according to claim 16, wherein said first reference clock signal is stabilized earlier than said second reference clock signal, after a power source is turned on.

19. The method according to claim 16, wherein said nonvolatile memory is a flash memory.

* * * * *